United States Patent
Lindsey

(10) Patent No.: US 7,071,432 B2
(45) Date of Patent: *Jul. 4, 2006

(54) REDUCTION OF OXIDES IN A FLUID-BASED SWITCH

(75) Inventor: John Ralph Lindsey, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/190,041

(22) Filed: Jul. 26, 2005

(65) Prior Publication Data

US 2005/0263379 A1 Dec. 1, 2005

Related U.S. Application Data

(63) Continuation-in-part of application No. 10/413,794, filed on Jan. 14, 2003, now Pat. No. 6,924,443.

(51) Int. Cl.
*H01H 29/00* (2006.01)

(52) U.S. Cl. .................................... 200/182

(58) Field of Classification Search ............. 200/182, 200/187–189, 193, 194, 214–216, 233–236; 310/328, 331, 348, 363; 335/4, 47, 78; 385/19

See application file for complete search history.

(56) References Cited

U.S. PATENT DOCUMENTS

| | | | |
|---|---|---|---|
| 2,312,672 A | 3/1943 | Pollard, Jr. | |
| 2,564,081 A | 8/1951 | Schilling | |
| 3,430,020 A | 2/1969 | Tomkewitsch et al. | |
| 3,529,268 A | 9/1970 | Rauterberg | |
| 3,600,537 A | 8/1971 | Twyford | |
| 3,639,165 A | 2/1972 | Rairden | |
| 3,657,647 A | 4/1972 | Beusman et al. | |
| 4,103,135 A | 7/1978 | Gomez et al. | |
| 4,200,779 A | 4/1980 | Zakurdaev et al. | |
| 4,238,748 A | 12/1980 | Goullin et al. | |
| 4,245,886 A | 1/1981 | Kolodzey et al. | |
| 4,336,570 A | 6/1982 | Brower et al. | |
| 4,419,650 A | 12/1983 | John | |
| 4,434,337 A | 2/1984 | Becker | |

(Continued)

FOREIGN PATENT DOCUMENTS

EP 0593836 A1 10/1992

(Continued)

OTHER PUBLICATIONS

Bhedwar, Homi C., et al., "Ceramic Multilayer Package Fabrication", Electronic Materials Handbook, Nov. 1989, pp. 460-469, vol. 1 Packaging, Section 4: Packages.

(Continued)

*Primary Examiner*—Michael A. Friedhofer

(57) ABSTRACT

In one embodiment, a switch includes first and second mated substrates defining therebetween a number of cavities. A plurality of wettable elements are exposed within one or more of the cavities. A switching fluid is held within one or more of the cavities. The switching fluid serves to connect and disconnect at least a pair of the plurality of wettable elements in response to forces that are applied to the switching fluid. A gas is also held within one or more of the cavities. The gas is provided to react with oxides on or in the cavities. An actuating fluid is held within one or more of the cavities and applies the forces to the switching fluid. Methods of making such a switch are also disclosed.

24 Claims, 6 Drawing Sheets

U.S. PATENT DOCUMENTS

| | | | |
|---|---|---|---|
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |
| 5,502,781 A | 3/1996 | Li et al. |
| 5,644,676 A | 7/1997 | Blomberg et al. |
| 5,675,310 A | 10/1997 | Wojnarowski et al. |
| 5,677,823 A | 10/1997 | Smith |
| 5,751,074 A | 5/1998 | Prior et al. |
| 5,751,552 A | 5/1998 | Scanlan et al. |
| 5,828,799 A | 10/1998 | Donald |
| 5,841,686 A | 11/1998 | Chu et al. |
| 5,849,623 A | 12/1998 | Wojnarowski et al. |
| 5,874,770 A | 2/1999 | Saia et al. |
| 5,875,531 A | 3/1999 | Nellissen et al. |
| 5,886,407 A | 3/1999 | Polese et al. |
| 5,889,325 A | 3/1999 | Uchida et al. |
| 5,912,606 A | 6/1999 | Nathanson et al. |
| 5,915,050 A | 6/1999 | Russell et al. |
| 5,972,737 A | 10/1999 | Polese et al. |
| 5,994,750 A | 11/1999 | Yagi |
| 6,021,048 A | 2/2000 | Smith |
| 6,180,873 B1 | 1/2001 | Bitko |
| 6,201,682 B1 | 3/2001 | Mooij et al. |
| 6,207,234 B1 | 3/2001 | Jiang |
| 6,212,308 B1 | 4/2001 | Donald |
| 6,225,133 B1 | 5/2001 | Yamamichi et al. |
| 6,278,541 B1 | 8/2001 | Baker |
| 6,304,450 B1 | 10/2001 | Dibene, II et al. |
| 6,320,994 B1 | 11/2001 | Donald et al. |
| 6,323,447 B1 | 11/2001 | Kondoh et al. |
| 6,351,579 B1 | 2/2002 | Early et al. |
| 6,356,679 B1 | 3/2002 | Kapany |
| 6,373,356 B1 | 4/2002 | Gutierrez |
| 6,396,012 B1 | 5/2002 | Bloomfield |
| 6,396,371 B1 | 5/2002 | Streeter et al. |
| 6,408,112 B1 | 6/2002 | Bartels |
| 6,446,317 B1 | 9/2002 | Figueroa et al. |
| 6,453,086 B1 | 9/2002 | Tarazona |
| 6,470,106 B1 | 10/2002 | McClelland et al. |
| 6,487,333 B1 | 11/2002 | Fouquet et al. |
| 6,501,354 B1 | 12/2002 | Gutierrez et al. |
| 6,512,322 B1 | 1/2003 | Wong |
| 6,515,404 B1 | 2/2003 | Wong |
| 6,516,504 B1 | 2/2003 | Schaper |
| 6,559,420 B1 | 5/2003 | Zarev |
| 6,633,213 B1 | 10/2003 | Dove |
| 6,781,074 B1 | 8/2004 | Fong et al. |
| 6,787,720 B1 | 9/2004 | Wong |
| 6,806,431 B1 | 10/2004 | Kondoh et al. |
| 6,822,176 B1 | 11/2004 | Fazzio |
| 6,831,532 B1 | 12/2004 | Fong et al. |
| 6,841,748 B1 | 1/2005 | Wong et al. |
| 6,855,898 B1 | 2/2005 | Wong et al. |
| 2002/0037128 A1 | 3/2002 | Burger et al. |
| 2002/0146197 A1 | 10/2002 | Yong |
| 2002/0150323 A1 | 10/2002 | Nishida et al. |
| 2002/0168133 A1 | 11/2002 | Saito |
| 2003/0035611 A1 | 2/2003 | Shi |
| 2004/0144632 A1 | 7/2004 | Wong et al. |
| 2005/0034962 A1 | 2/2005 | Wong et al. |

FOREIGN PATENT DOCUMENTS

| | | |
|---|---|---|
| FR | 2458138 | 12/1980 |
| FR | 2667396 | 4/1992 |
| JP | SHO 36-18575 | 10/1961 |
| JP | SHO 47-21645 | 10/1972 |
| JP | 62-276838 | 12/1987 |
| JP | 8-125487 | 5/1996 |
| JP | 9161640 A | 4/1997 |
| JP | 63-294317 | 12/1998 |
| WO | WO 99/46624 | 9/1999 |

OTHER PUBLICATIONS

Jonathan Simon, et al., "A Liquid Filled Microrelay with a Moving Mercury Microdrop", Journal of Microelectromechanical Systems, Sep. 1997, pp. 208-216, vol. 6, No. 3.

TDB-ACC-NO.: NB8406827, "Integral Power Resistors For Aluminum Substrate", IBM Technical Disclosure Bulletin, Jun. 1984, US, vol. 27, Issue No. 18, p. 827.

Kim, Joonwon, et al., "A Micromechanical Switch with Electrostatically Driven Liquid-Metal Droplet", Sensors and Actuators, A; Physical v 9798, Apr. 1, 2002, 4 pages.

ured in the United States.

REDUCTION OF OXIDES IN A FLUID-BASED SWITCH

CROSS REFERENCE TO RELATED APPLICATION

This is a continuation-in-part of U.S. patent application Ser. No. 10/413,794 filed on Apr. 14, 2003 now U.S. Pat. No. 6,924,443, which is hereby incorporated by reference for all that it discloses.

BACKGROUND

Liquid metal micro switches (LIMMS) have been made that use a liquid metal, such as mercury, as the switching fluid. The liquid metal may make and break electrical contacts. To change the state of the switch, a force is applied to the switching fluid, which causes it to change form and move. Often, oxides may form within the switch and inhibit proper functioning of the switch. For example, the oxides may increase or decrease the surface tension of the liquid metal, which may increase or decrease the energy required for the switch to change state.

SUMMARY OF THE INVENTION

In a first embodiment, a method of forming a switch is disclosed. The method is performed in an environment having a low partial pressure of oxygen, wherein the low partial pressure of oxygen is at or below a critical limit to reduce formation of oxides. The method comprises depositing a switching fluid on a first substrate, and then mating the first substrate to a second substrate to define therebetween a cavity holding the switching fluid. The cavity is sized to allow movement of the switching fluid between first and second states.

In a second embodiment, a method of forming a switch is performed in an environment containing a gas, other than oxygen, that reduces formation of oxides. The method comprises depositing a switching fluid on a first substrate, and then mating the first substrate to a second substrate to define therebetween a cavity holding the switching fluid. The cavity is sized to allow movement of the switching fluid between first and second states.

In a third embodiment, a method of forming a switch comprises depositing a switching fluid on a first substrate. The first substrate is then mated to a second substrate to define a cavity therebetween. The cavity holds the switching fluid and is sized to allow movement of the switching fluid between first and second states. After the substrates are mated, a gas to react with oxides within the cavity is created in the cavity.

In a fourth embodiment, a method of forming a switch comprises depositing a switching fluid on a first substrate. The first substrate is mated to a second substrate to define a cavity therebetween. The cavity holds the switching fluid and is sized to allow movement of the switching fluid between first and second states. After the substrates are mated, a gas to react with oxides within the cavity is injected into the cavity.

In a fifth embodiment, a method of forming a switch comprises depositing a switching fluid on a first substrate. The first substrate is mated to a second substrate to define a cavity therebetween. The cavity holds the switching fluid and is sized to allow movement of the switching fluid between first and second states. The cavity is also connected to a gas supply channel extending from within to outside the cavity. In an environment containing a controlled pressure of one or more gases, the switch, including the gas supply channel, is hermetically sealed to trap a desired pressure of the one or more gases in the cavity.

In a sixth embodiment, a switch comprises first and second mated substrates, a plurality of wettable elements, a switching fluid, a gas, and an actuating fluid. The first and second mated substrates define therebetween a number of cavities. The plurality of wettable elements is exposed within one or more of the cavities. The switching fluid is held within one or more of the cavities and serves to connect and disconnect at least a pair of the plurality of wettable elements in response to forces that are applied to the switching fluid. The gas is held within one or more of the cavities to react with oxides on or in the cavities. The actuating fluid is held within one or more of the cavities and applies the forces to the switching fluid.

Other embodiments are also disclosed.

BRIEF DESCRIPTION OF THE DRAWINGS

Illustrative embodiments of the invention are illustrated in the drawings, in which.

DETAILED DESCRIPTION

A fluid-based switch is one in which a switching fluid is moved between different states to perform the switching function of the switch. For example, in an electrical switch, a switching fluid may be moved between different states to electrically couple and decouple pairs of electrodes; and in an optical switch, an opaque switching fluid may be moved between different states to couple and decouple pairs of wettable pads, thereby blocking and unblocking one or more light paths.

One impediment to the manufacture and operation of a fluid-based switch is oxides. Oxides can lead to poor switch performance, and even switch failure, because they lessen or prevent a switching fluid from wetting surfaces it is supposed to wet (e.g., electrodes or wettable pads), and they increase the likelihood that a switching fluid will wet surfaces that it should not (e.g., the walls of a switching fluid cavity).

Disclosed herein are various ways to reduce or eliminate the formation of oxides in a fluid-based switch. However, before describing these methods, some exemplary fluid-based switches will be described in greater detail.

Figure 1:
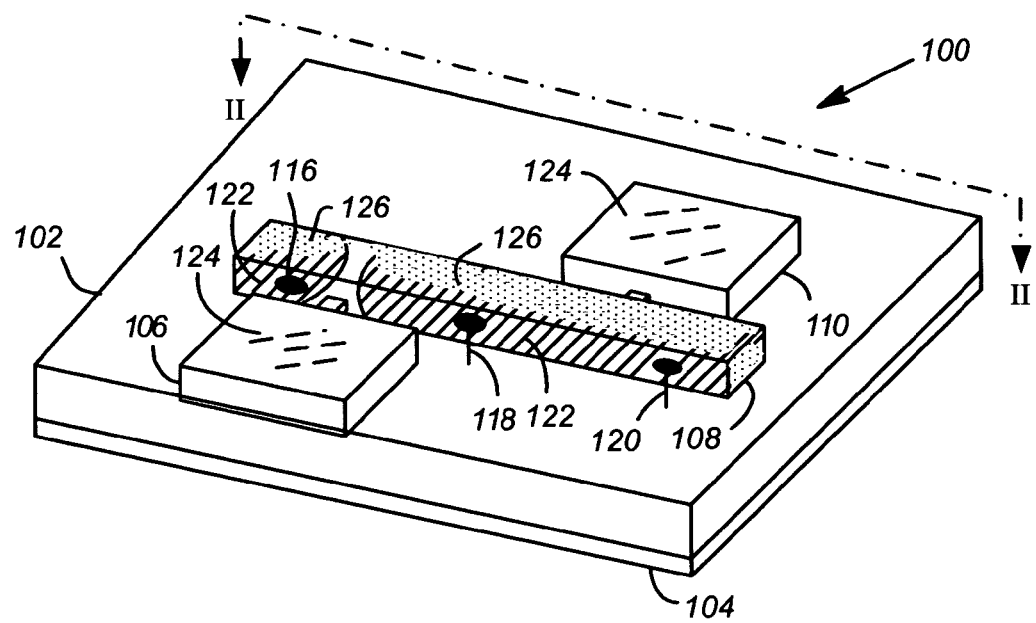
FIG. 1 illustrates a perspective view of a first exemplary embodiment of a fluid-based switch.
Figure 2:
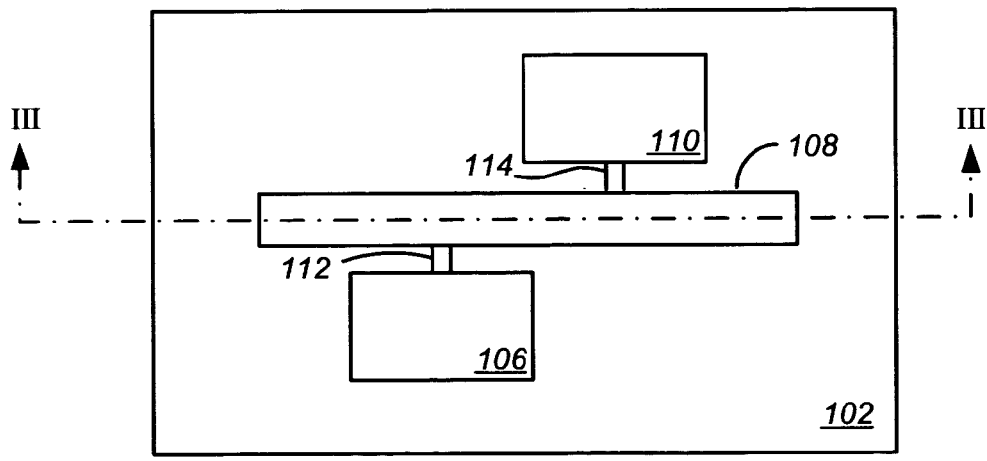
FIG. 2 illustrates a plan view of the cavities of the FIG. 1 switch.

FIG. 1 illustrates a first exemplary embodiment of a switch 100. The switch 100 comprises first and second mated substrates 102, 104 that define between them a number of cavities 106, 108, 110, 112, 114 Although five cavities 106–114 are shown, it is envisioned that more or fewer cavities may be formed within the switch 100. By way of example, the cavities are shown to comprise a switching fluid cavity 108, a pair of actuating fluid cavities 106, 110, and a pair of cavities 112, 114 that connect corresponding ones of the actuating fluid cavities 106, 110 to the switching fluid cavity 108. A plan view of these cavities 106–114 is shown in FIG. 2.

Exposed within one or more of the cavities is a plurality of electrodes 116, 118, 120 (i.e., a plurality of wettable elements). Although the switch 100 comprises three electrodes 116–120, alternate switch embodiments may have different numbers of (two or more) electrodes.

A switching fluid 122 held within one or more of the cavities serves to open and close at least a pair of the electrodes 116–120 in response to forces that are applied to the switching fluid 122. By way of example, the switching fluid 122 may comprise a conductive liquid metal, such as mercury, gallium, sodium potassium or an alloy thereof. An actuating fluid 124 (e.g., an inert gas or liquid) held within one or more of the cavities may be used to apply the forces to the switching fluid 122.

Figure 3:
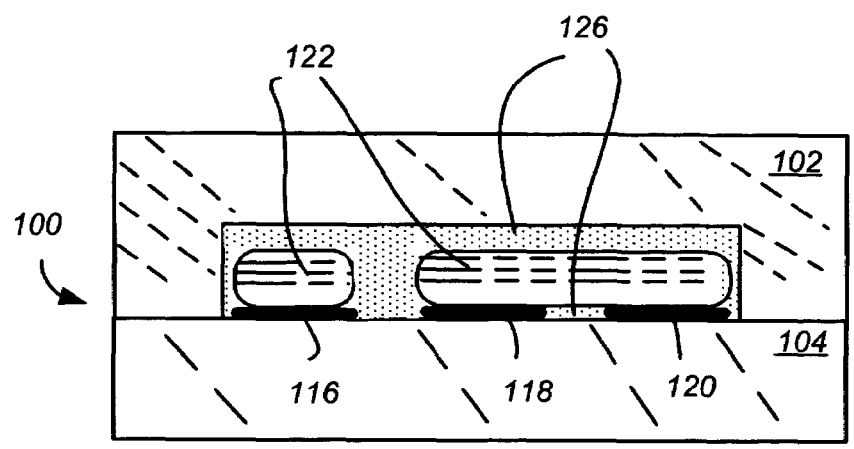
FIG. 3 illustrates a cross-section of the switch shown in FIG. 1.

A cross-section of the switch 100, illustrating the switching fluid 122 in relation to the electrodes 116–120, is shown in FIG. 3.

The forces applied to the switching fluid 122 may result from pressure changes in the actuating fluid 124. That is, the pressure changes in the actuating fluid 124 may impart pressure changes to the switching fluid 122, thereby causing the switching fluid 122 to change form, move, part, etc. In FIG. 1, the pressure of the actuating fluid 124 held in cavity 106 applies a force to part the switching fluid 122 as illustrated. In this state, the rightmost pair of the switch's electrodes 118, 120 are coupled to one another. If the pressure of the actuating fluid 124 held in cavity 106 is relieved, and the pressure of the actuating fluid 124 held in cavity 110 is increased, the switching fluid 122 can be forced to part and merge so that electrodes 118 and 120 are decoupled and electrodes 116 and 118 are coupled.

By way of example, pressure changes in the actuating fluid 124 may be achieved by means of heating the actuating fluid 124, or by means of piezoelectric pumping. The former is described in U.S. Pat. No. 6,323,447 of Kondoh et al. entitled "Electrical Contact Breaker Switch, Integrated Electrical Contact Breaker Switch, and Electrical Contact Switching Method", which is hereby incorporated by reference for all that it discloses. The latter is described in U.S. Pat. No. 6,750,594 of Wong entitled "A Piezoelectrically Actuated Liquid Metal Switch", which is also incorporated by reference for all that it discloses. Although the above referenced patents disclose the movement of a switching fluid by means of dual push/pull actuating fluid cavities, a single push/pull actuating fluid cavity might suffice if significant enough push/pull pressure changes could be imparted to a switching fluid from such a cavity.

Additional details concerning the construction and operation of a switch such as that which is illustrated in FIG. 1 may be found in the aforementioned patents of Kondoh et al. and Wong.

Figure 4:
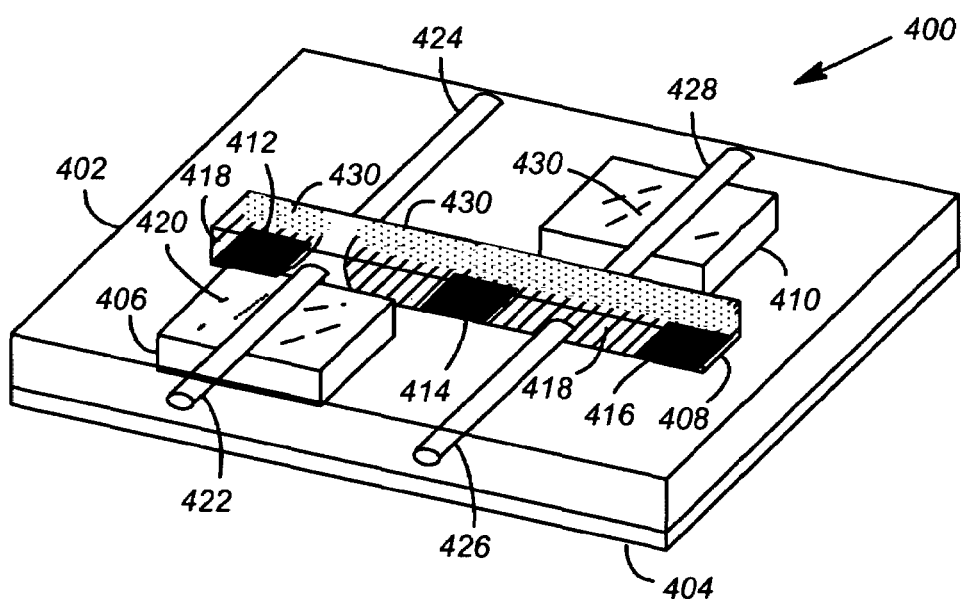
FIG. 4 illustrates a second exemplary embodiment of a fluid-based switch.

FIG. 4 illustrates a second exemplary embodiment of a switch 400. The switch 400 comprises first and second mated substrates 402, 404 that define between them a number of cavities 406, 408, 410. Exposed within one or more of the cavities are a plurality of wettable pads 412, 414, 416 (i.e., a plurality of wettable elements). Although three cavities 406–410 are shown, it is envisioned that more or fewer cavities may be formed within the switch 400.

A switching fluid 418 held within one or more of the cavities wets to the pads 412–416 and serves to open and block light paths 422/424, 426/428 through one or more of the cavities, in response to forces that are applied to the switching fluid 418. By way of example, the switching fluid 418 may comprise a conductive liquid metal, such as mercury, gallium, sodium potassium or an alloy thereof. The light paths may be defined by waveguides 422–428 that are aligned with translucent windows in the cavity 408 holding the switching fluid 418. Blocking of the light paths 422/424, 426/428 may be achieved by virtue of the switching fluid 418 being opaque. An actuating fluid 420 (e.g., an inert gas or liquid) held within one or more of the cavities serves to apply the forces to the switching fluid 418.

Additional details concerning the construction and operation of a switch such as that which is illustrated in FIG. 4 may be found in the aforementioned patents of Kondoh et al. and Wong.

As previously indicated, one impediment to the manufacture and operation of fluid-based switches is the formation and presence of oxides. It has been discovered that these oxides can form in a variety of ways, and in a variety of places. For example, oxides can form on or in a switch's switching fluid 122, 418. Oxides can also form on contamination that is on or in the switching fluid 122, 418 (i.e., oxides of contamination can form on or in the switching fluid 122, 418). Oxides can also form on or in wettable elements, such as electrodes 116–120 or wettable pads 412–416. Or, oxides of contamination can form on or in the wettable elements 116–120, 412–416. Oxides can also form on the walls of a switch's cavities, and can include oxides of contamination on the walls of the switch's cavities. Further, oxides can form on or in alloys of elements that are housed within a switch's cavities (e.g., alloys formed between a switching fluid and its wettable elements, or alloys formed between a switching fluid and contamination).

Oxides can be introduced before or during switch manufacture, in the form of oxidized switch materials or contaminants. Or, oxides can form after switch manufacture (e.g., during use). Regardless, oxides can lead to poor switch performance, and even switch failure, because they lessen or prevent a switching fluid from wetting surfaces it is supposed to wet (e.g., electrodes or wettable pads), and they increase the likelihood that a switching fluid will wet surfaces that it should not (e.g., the walls of a switching fluid cavity).

Figure 5:
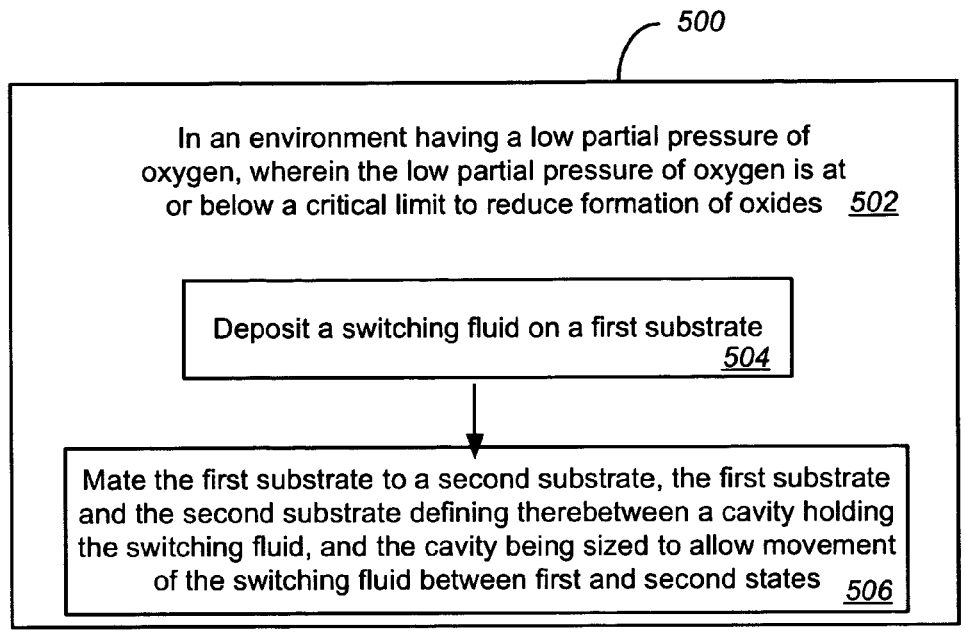
FIG. 5 illustrates a first exemplary method of reducing oxides in a fluid-based switch.

One method 500 of reducing oxides is shown in FIG. 5. The method 500 comprises manufacturing a switch 100, 400 in an environment 502 having a low partial pressure of oxygen, wherein the low partial pressure of oxygen is at or below a critical limit to reduce formation of oxides. Within this environment, a switching fluid 122, 418 is deposited 504 on a first substrate 102, 402 of the switch; and the first substrate 102, 402 is mated 506 to a second substrate 104, 404 to define therebetween a cavity 108, 408 holding the switching fluid 122, 418. The cavity 108, 408 is sized to allow movement of the switching fluid 122, 418 between first and second states (e.g., as discussed with reference to switches 100 and 400, and as shown in FIG. 3).

By way of example, the environment with a low partial pressure of oxygen can be maintained in a vacuum chamber where the pressure of oxygen (and other gasses) is controlled and maintained.

The partial pressure of oxygen that is "low" enough to reduce formation of oxides (i.e., the pressure that is at or below a "critical limit") will vary depending on a switch's temperature and materials. By way of example, an oxygen partial pressure of less than 3.5 Torr will reduce mercury oxides in a switch that 1) uses a mercury switching fluid, and 2) will be manufactured and used at room temperature. Ellingham Diagrams may be used to determine what partial pressure of oxygen is below the "critical limit" for reducing formation of oxides for other combinations of temperature and materials.

Figure 6:
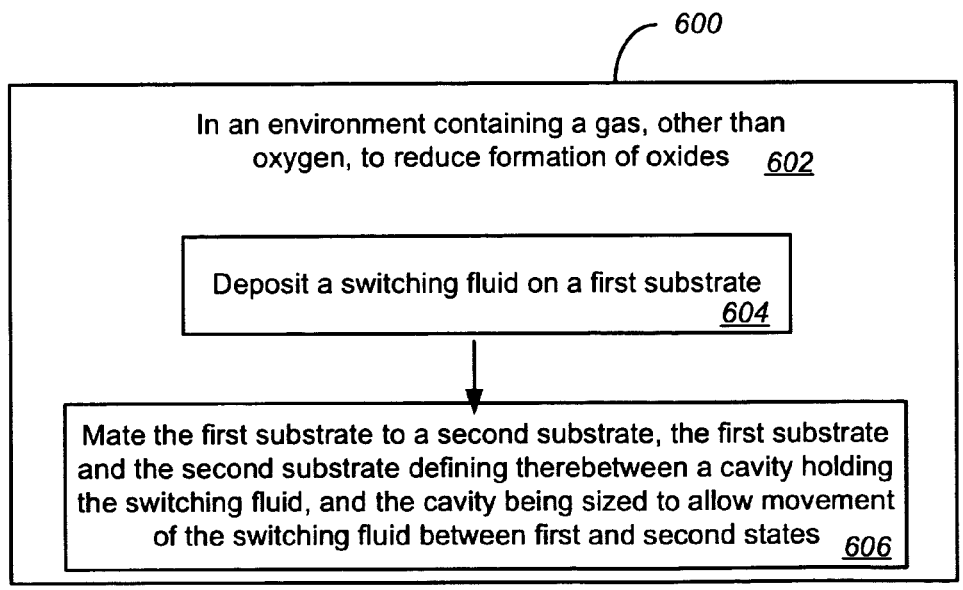
FIG. 6 illustrates a second exemplary method of reducing oxides in a fluid-based switch.

Another method 600 of reducing oxides is shown in FIG. 6. The method 600 comprises manufacturing a switch 100, 400 in an environment 602 containing a gas 126, 430, other than oxygen, to reduce formation of oxides. Within this environment, a switching fluid 122, 418 is deposited 604 on a first substrate 102, 402 of the switch; and the first substrate 102, 402 is mated 606 to a second substrate 104, 404 to define therebetween a cavity 108, 408 holding the switching fluid 122, 418. Again, the cavity 108, 408 is sized to allow movement of the switching fluid 122, 418 between first and second states (e.g., as discussed with reference to switches 100 and 400, and as shown in FIG. 3).

By way of example, the gaseous environment can be maintained in a vacuum chamber or other controlled environment where the composition of gasses present can be controlled and maintained. In some embodiments, the gas 126, 430 "other than oxygen" may comprise one or both of hydrogen gas and carbon monoxide gas. If hydrogen gas is used, it may be mixed with at least one of nitrogen gas and helium gas (to increase its stability and safety). Other gases that react with oxygen to "bind" it and prevent it from forming oxides may also be used.

By manufacturing a switch 100, 400 in an environment containing an oxide-reducing gas 126, 430, the oxide-reducing gas 126, 430 may 1) react with oxygen and oxides during switch manufacture, and 2) be trapped within a switch's switching fluid cavity 108, 408 so as to react with oxygen and oxides during switch operation.

Figure 7:
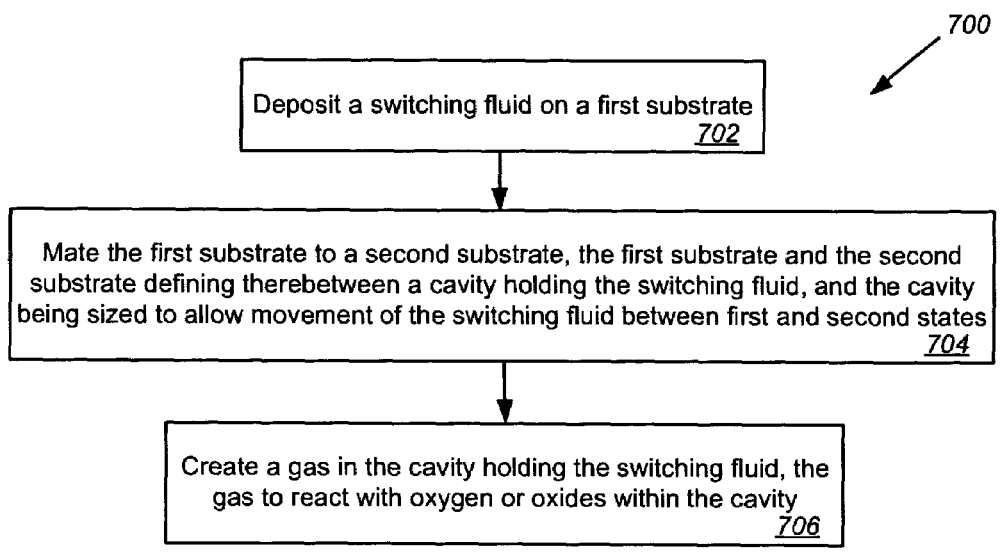
FIG. 7 illustrates a third exemplary method of reducing oxides in a fluid-based switch.

Yet another method 700 of reducing oxides is shown in FIG. 7. The method 700 comprises depositing 702 a switching fluid 122, 418 on a first substrate 102, 402 of the switch; and then mating 704 the first substrate 102, 402 to a second substrate 104, 404 to define therebetween a cavity 108, 408 holding the switching fluid 122, 418. Again, the cavity 108, 408 is sized to allow movement of the switching fluid 122, 418 between first and second states (e.g., as discussed with reference to switches 100 and 400, and as shown in FIG. 3). A gas 126, 430 that reacts with oxygen or oxides in the cavity 108, 408 is then created 706 in the cavity 108, 408.

The gas 126, 430 may be created by depositing a catalyst 800 on one of the switch's substrates 102, 104, before the substrates 102, 104 are mated. By way of example, the catalyst may be platinum or palladium. A carbon layer 802 may then be deposited on the catalyst. After the substrates 102, 104 are mated, the catalyst may be excited (e.g., by heating or irradiation) to initiate a reaction between the carbon and oxygen (or oxides), thereby leading to the production of carbon monoxide gas.

Figure 8:
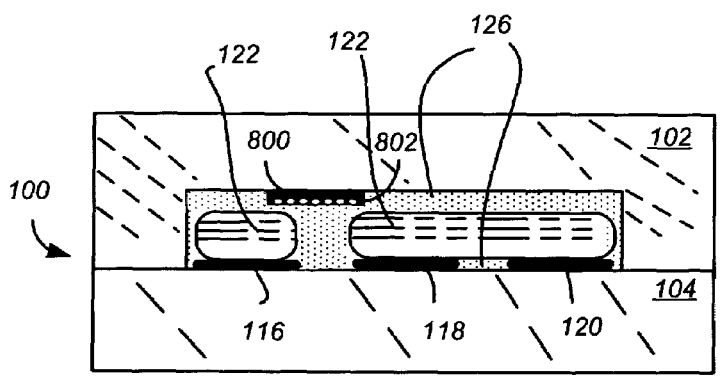
FIG. 8 illustrates the use of a catalyst to create a gas in a fluid-based switch.

Although FIG. 8 illustrates the catalyst 800 deposited in the cavity 108 holding the switching fluid 122, the catalyst may alternately be deposited in other locations. For example, in one embodiment, the catalyst may be a heater (e.g., a thick or thin-film resistance heater) held within one of the actuating fluid cavities 106, 110, and the carbon layer may be deposited on the heater. The created gas may then, over time, be distributed to the switching fluid cavity 108 as a result of the pressure changes in the actuating fluid cavities 106, 110.

Figure 9:
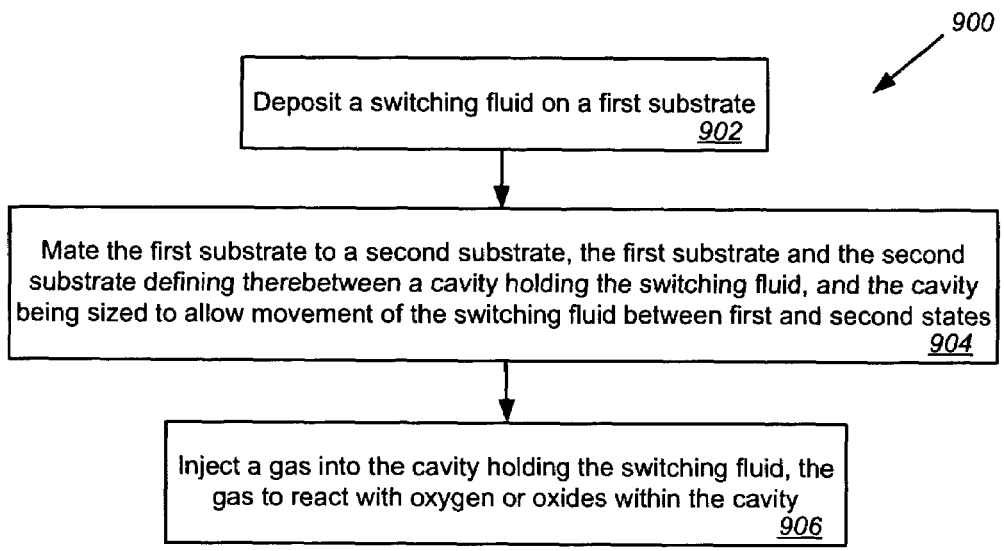
FIG. 9 illustrates a fourth exemplary method of reducing oxides in a fluid-based switch.

An additional method 900 of reducing oxides (FIG. 9) comprises depositing 902 a switching fluid 122, 418 on a first substrate 102, 402 of the switch; and then mating 904 the first substrate 102, 402 to a second substrate 104, 404 to define therebetween a cavity 108, 408 holding the switching fluid 122, 418. Again, the cavity 108, 408 is sized to allow movement of the switching fluid 122, 418 between first and second states (e.g., as discussed with reference to switches 100 and 400, and as shown in FIG. 3). A gas 126, 430 that reacts with oxygen or oxides in the cavity 108, 408 is then injected 906 into the cavity 108, 408.

Figure 10:
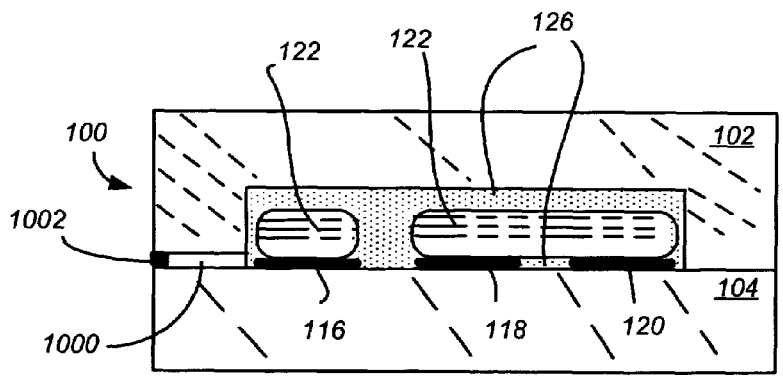
FIG. 10 illustrates the use of a gas injection channel to inject a gas into a fluid-based switch.

As shown in FIG. 10, gas 126 may be injected into the cavity 108 by means of a gas injection channel 1000. The gas injection channel extends from within to outside the cavity 108, and may be formed as a result of mating a switch's substrates 102, 104 (as shown). Alternately, the gas injection channel may be fully formed within a single substrate (e.g., by means of a pre-drilled channel or "hole").

At some point, the gas injection channel 1000 needs to be sealed. In one embodiment, the channel 1000 is sealed prior to when gas is injected via the channel 1000, and a syringe is then used to momentarily puncture the seal. In another embodiment, the channel 1000 is sealed by injecting a sealant into the channel 1000 as a syringe is withdrawn from the channel 1000. In yet another embodiment, a sealant is melted, cured or fused as a syringe is withdrawn from the channel 1000. In any case, the seal 1002 prevents the passage of gases into or out of the cavity 108.

Gas 126 may also be removed from the cavity 108 via the channel 1000. By removing or injecting different kinds or amounts of gas, the pressures or gas types within the cavity 108 may be adjusted so as to reduce the formation of oxides within the cavity 108.

Figure 11:
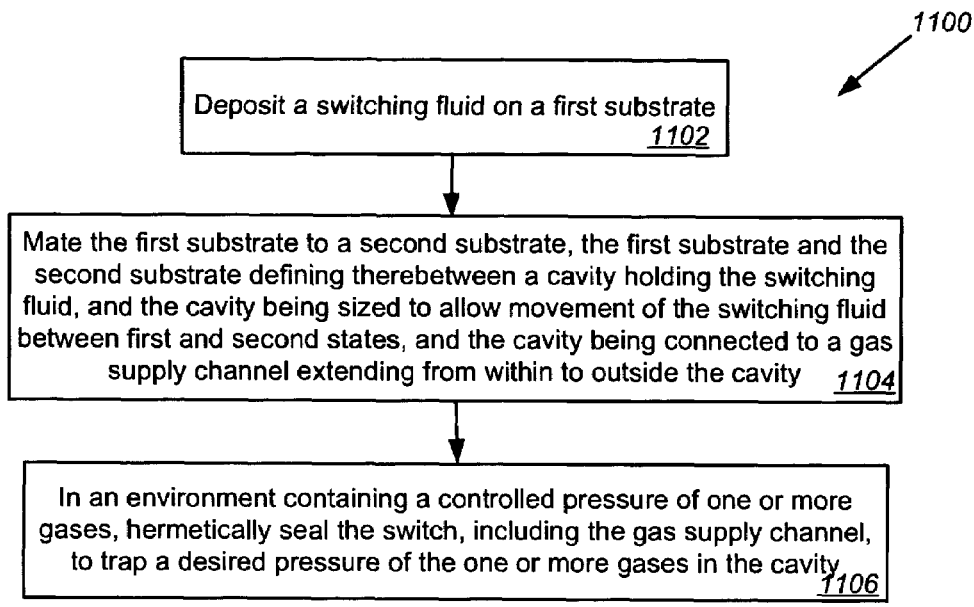
FIG. 11 illustrates a fifth exemplary method of reducing oxides in a fluid-based switch.

A final method 1100 of reducing oxides (FIG. 11) in a fluid-based switch comprises depositing 1102 a switching fluid 122, 418 on a first substrate 102, 402 of the switch; and then mating 1104 the first substrate 102, 402 to a second substrate 104, 404 to define therebetween a cavity 108, 408 holding the switching fluid 122, 418. Again, the cavity 108, 408 is sized to allow movement of the switching fluid 122, 418 between first and second states (e.g., as discussed with reference to switches 100 and 400, and as shown in FIG. 3).

Figure 12:
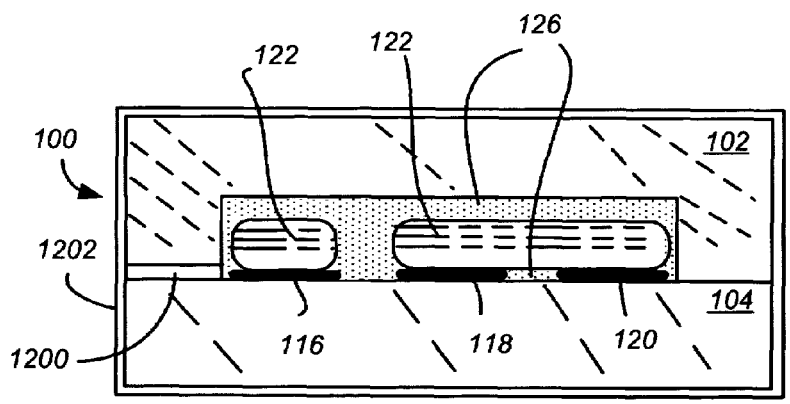
FIG. 12 illustrates the use and hermetic sealing of a gas supply channel of a fluid-based switch.

Connected to the cavity 108 is a gas supply channel 1200 (FIG. 12). The gas supply channel 1200 extends from within to outside the cavity 108, and may be formed as a result of mating the switch's substrates 102, 104 (as shown). Alternately, the gas supply channel may be fully formed within a single substrate (e.g., by means of a pre-drilled channel or "hole"). In an environment containing a controlled pressure of one or more gases 126, the switch 100, including the gas supply channel 1200, is hermetically sealed 1106 (via, for example, hermetic seal 1202) to trap a desired pressure of the one or more gases 126 in the cavity 108. Alternately, just the gas supply channel 1200 is sealed.

In one embodiment, the environment under which the sealing 1106 occurs may be controlled by controlling the pressure of oxygen in the environment. In another embodiment, the environment may be controlled by controlling the pressure(s) of one or more oxide-reducing gases.

In some cases, various ones of the methods 500, 600, 700, 900, 1100 disclosed herein may be combined. Also, it may sometimes be necessary (or useful) to promote the reaction of a gas 126, 430 with oxygen or oxides by heating the gas, or by otherwise activating a catalyst.

When an oxide forms on a surface (e.g., an electrode) to which a switch's switching fluid 122, 418 wets, it is unlikely that an oxide-reducing gas 126, 430 will come into contact with the oxide. However, if the oxide progresses to the point that the switching fluid 122, 418 begins to de-wet the surface, the oxide-reducing gas 126, 430 will then contact and react with the oxide, thereby enabling a switch 100, 400 to self-heal itself.

What is claimed is:

1. A method, comprising:
in an environment having a low partial pressure of oxygen, wherein the low partial pressure of oxygen is at or below a critical limit to reduce formation of oxides:
i) depositing a switching fluid on a first substrate; and
ii) mating the first substrate to a second substrate, the first substrate and the second substrate defining therebetween a cavity holding the switching fluid, the cavity being sized to allow movement of the switching fluid between first and second states.

2. The method of claim 1, wherein the environment further comprises a gas, other than oxygen, that reacts with oxygen, or oxides that are, or will be, on or in the cavity holding the switching fluid; the oxides including at least one of: i) oxides on or in the switching fluid; ii) oxides of contamination on or in the switching fluid; iii) oxides on inner surfaces of the cavity; iv) oxides of contamination on the inner surfaces of the cavity; and v) oxides on or in alloys of elements in the cavity.

3. The method of claim 1, wherein the environment further comprises a gas other than oxygen, the gas comprising at least one of: hydrogen gas and carbon monoxide gas.

4. A method, comprising:
in an environment containing a gas, other than oxygen, to reduce formation of oxides:
i) depositing a switching fluid on a first substrate;
ii) mating the first substrate to a second substrate, the first substrate and the second substrate defining therebetween a cavity holding the switching fluid, the cavity being sized to allow movement of the switching fluid between first and second states.

5. The method of claim 4, wherein the gas reacts with oxygen, or with oxides that are, or will be, on or in the cavity holding the switching fluid; the oxides including at least one of: i) oxides on or in the switching fluid; ii) oxides of contamination on or in the switching fluid; iii) oxides on inner surfaces of the cavity; iv) oxides of contamination on inner surfaces of the cavity; and v) oxides on or in alloys of elements in the cavity.

6. The method of claim 4, wherein the gas comprises at least one of: hydrogen gas and carbon monoxide gas.

7. The method of claim 4, wherein the gas comprises hydrogen gas, mixed with at least one of: nitrogen gas and helium gas.

8. A method, comprising:
depositing a switching fluid on a first substrate;
mating the first substrate to a second substrate, the first substrate and the second substrate defining therebetween a cavity holding the switching fluid, the cavity being sized to allow movement of the switching fluid between first and second states; and
creating a gas in the cavity holding the switching fluid, the gas to react with oxygen or oxides within the cavity.

9. The method of claim 8, further comprising:
before mating the substrates, depositing a catalyst on one of the substrates;
depositing a carbon layer on the catalyst; and
after mating the substrates, exciting the catalyst to create the gas.

10. The method of claim 8, wherein the gas is created to react with oxygen in the switch, or oxides on or in the cavity holding the switching fluid; the oxides including at least one of: i) oxides on or in the switching fluid; ii) oxides of contamination on or in the switching fluid; iii) oxides on inner surfaces of the cavity; iv) oxides of contamination on the inner surfaces of the cavity; and v) oxides on or in alloys of elements in the cavity.

11. A method, comprising:
depositing a switching fluid on a first substrate;
mating the first substrate to a second substrate, the first substrate and the second substrate defining therebetween a cavity holding the switching fluid, the cavity being sized to allow movement of the switching fluid between first and second states; and
injecting a gas into the cavity, the gas to react with oxygen or oxides within the cavity.

12. The method of claim 11, wherein the gas is injected into the cavity via a gas injection channel that extends from within to outside the cavity; the method further comprising sealing the gas injection channel to prevent passage of gases into or out of the cavity.

13. The method of claim 12, wherein injecting the gas into the cavity comprises injecting the gas via the gas injection channel.

14. The method of claim 11, wherein the gas is injected to react with oxygen in the switch, or oxides on or in the cavity holding the switching fluid; the oxides including at least one of: i) oxides on or in the switching fluid; ii) oxides of contamination on or in the switching fluid; iii) oxides on inner surfaces of the cavity; iv) oxides of contamination on the inner surfaces of the cavity; and v) oxides on or in alloys of elements in the cavity.

15. A method of reducing oxides in a switch, comprising:
depositing a switching fluid on a first substrate;
mating the first substrate to a second substrate, the first substrate and the second substrate defining therebetween a cavity holding the switching fluid, the cavity being sized to allow movement of the switching fluid between first and second states, and the cavity being connected to a gas supply channel extending from within to outside the cavity; and
in an environment containing a controlled pressure of one or more gases, hermetically sealing the switch, including the gas supply channel, to trap a desired pressure of the one or more gases in the cavity.

16. The method of claim 15, wherein the environment contains a controlled pressure of oxygen.

17. The method of claim 15, wherein the environment contains a controlled pressure of at least one oxide-reducing gas.

18. A switch, comprising:
first and second mated substrates defining therebetween a number of cavities;
a plurality of wettable elements exposed within one or more of the cavities;
a switching fluid, held within one or more of the cavities, that serves to connect and disconnect at least a pair of the plurality of wettable elements in response to forces that are applied to the switching fluid;

a gas, held within one or more of the cavities, to react with oxygen or oxides on or in the cavities; and an actuating fluid, held within one or more of the cavities, that applies the forces to the switching fluid.

19. The switch of claim 18, wherein the plurality of wettable elements comprise a plurality of electrodes.

20. The switch of claim 18, wherein the plurality of wettable elements comprise a plurality of wettable pads.

21. The switch of claim 18, further comprising:

a gas injection channel that extends from within to outside the cavity; and a seal blocking the gas injection channel to prevent passage of gases into or out of the cavity.

22. The switch of claim 18, wherein the gas comprises hydrogen gas, mixed with at least one of: nitrogen gas and helium gas.

23. The switch of claim 18, wherein the switching fluid comprises one of: mercury, a mercury alloy, gallium, a gallium alloy, sodium potassium, and sodium potassium alloy.

24. The switch of claim 18, wherein the gas reacts with at least one of: i) oxides on or in the switching fluid; ii) oxides of contamination on or in the switching fluid; iii) oxides on or in the wettable elements; iv) oxides of contamination on or in the wettable elements; v) oxides on walls of the cavity; vi) oxides of contamination on walls of the cavity; vii) oxides on or in alloys of elements in the cavity; or viii) oxygen.

* * * * *

UNITED STATES PATENT AND TRADEMARK OFFICE
CERTIFICATE OF CORRECTION

PATENT NO.         : 7,071,432 B2                                           Page 1 of 1
APPLICATION NO. : 11/190041
DATED              : July 4, 2006
INVENTOR(S)        : Lindsey It is certified that error appears in the above-identified patent and that said Letters Patent is hereby corrected as shown below:

On the face page, in field (63), under "Related U.S. Application Data, in column 1, lines 1-2, delete "application No. 10/413,794, filed on Jan. 14, 2003, now Pat. No. 6,924,443." and insert -- U.S. Pat. No. 6,924,443, filed on Apr. 14, 2003, --, therefor.

On the face page, in field (56), under "Other Publications", in column 2, line 3, delete "vol." and insert -- Vol. --, therefor.

In column 1, lines 7-9, delete "U.S. patent application Ser. No. 10/413,794 filed on Apr. 14, 2003 now U.S. Pat. No. 6,924,443," and insert -- U.S. Pat. No. 6,924,443, filed on Apr. 14, 2003, --, therefor.

Signed and Sealed this

Fifth Day of December, 2006

JON W. DUDAS
*Director of the United States Patent and Trademark Office*